(12) United States Patent
Gustavsson et al.

(10) Patent No.: US 11,189,108 B2
(45) Date of Patent: Nov. 30, 2021

(54) METHOD, DEVICE AND COMPUTER PROGRAM FOR GENERATING A VIRTUAL SCENE OF OBJECTS

(71) Applicant: Inter IKEA Systems B.V., LN Delft (NL)

(72) Inventors: Jonas Gustavsson, Höör (SE); Kip Haynes, Kirkland, WA (US)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 17/082,608

(22) Filed: Oct. 28, 2020

(65) Prior Publication Data

US 2021/0134071 A1 May 6, 2021

(30) Foreign Application Priority Data

Nov. 1, 2019 (EP) ..................................... 19206700

(51) Int. Cl.
| | | |
|---|---|---|
| *G06T 19/20* | (2011.01) | |
| *G06T 7/11* | (2017.01) | |
| *G06T 15/20* | (2011.01) | |
| *G06T 7/70* | (2017.01) | |

(52) U.S. Cl.
CPC ............... *G06T 19/20* (2013.01); *G06T 7/11* (2017.01); *G06T 7/70* (2017.01); *G06T 15/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2005/0081161 A1* | 4/2005 | MacInnes | ................ G06K 9/00 715/765 |
| 2016/0148433 A1* | 5/2016 | Petrovskaya | .......... G02B 27/01 345/633 |
| 2018/0374276 A1* | 12/2018 | Powers | ................... G06T 19/20 |
| 2019/0188915 A1 | 6/2019 | Meier et al. | |

OTHER PUBLICATIONS

European Search Report for EP Application No. 19206700.7 dated Apr. 22, 2020 (12 pages).
Tang et al. "AR Interior Designer: Automatic Furniture Arrangement using Spatial and Functional Relationships." IEEE 2014 Conference on Virtual Systems & Multimedia. (2014) pp. 345-352.
Izadinia et al. "IM2CAD" IEEE Conference on Computer Vision and Pattern Recognition. (2017) pp. 2422-2431.
Kan et al. "Automated Interior Design Using a Genetic Algorithm." Virtual Reality Software and Technology. (2017) pp. 1-10.

* cited by examiner

*Primary Examiner* — Frank S Chen
(74) *Attorney, Agent, or Firm* — Merchant & Gould P.C.

(57) ABSTRACT

The present disclosure relates to the field of image analysis, in particular, it relates to a method for generating a virtual scene of objects. The disclosure also relates to a device comprising circuitry configured to carry out the method. The disclosure also relates to a computer program product adapted to carry out the method.

15 Claims, 4 Drawing Sheets

METHOD, DEVICE AND COMPUTER PROGRAM FOR GENERATING A VIRTUAL SCENE OF OBJECTS

CROSS-REFERENCE TO RELATED APPLICATION

This application claims benefit of Serial No. 19206700.7, filed 1 Nov. 2019 in Europe and which application is incorporated herein by reference. To the extent appropriate, a claim of priority is made to the above disclosed application.

FIELD OF THE INVENTION

The present disclosure relates to the field of image analysis, in particular, it relates to a method for generating a virtual scene of objects. The disclosure also relates to a device comprising circuitry configured to carry out the method. The disclosure also relates to a computer program product adapted to carry out the method.

BACKGROUND ART

In image search approaches, it is often desirous to determine and identify which objects are present in an image. Image search approaches and image recognition approaches are common for commercial use, for example to generate product catalogues and product suggestions. It has been desirous to achieve a system where a user can take a photograph of a room, where the image search process can use image data to search product catalogues on the internet to return for example different stores' prices for a given product.

However, rooms are often filled with objects, and it is often desirous to add new products to the room.

Typically, an image can be searched for empty spaces with the use of an image search algorithm. Some computer programs have the ability to use the identified empty spaces in a searched image to recommend a product or object to be placed in the empty space.

The typical product suggestion software program is based on an identified empty space, and making the suggestions for how to fill such an empty space.

Therefore, there is room for improvements in the field of image search and spatial search approaches.

SUMMARY OF THE INVENTION

In view of that stated above, the object of the present invention is to provide a method for rearranging objects in a scene of an image to render a variety of suggestions for furnishing. It is further an object to use image analysis and image manipulation approaches to achieve the above in an automatic or semi-automatic fashion.

To achieve at least one of the above objects and also other objects that will be evident from the following description, a computer implemented method, a device for carrying out the method, and a computer program product for carrying out the method provided according to the present invention. Preferred embodiments of the device will be evident from the description.

According to a first aspect, there is provided a computer implemented method for generating a virtual scene of objects, the method comprising the steps of:
receiving an image of a scene;
determining a 3D coordinate space of the scene;
identifying one or more objects within the scene, wherein the identifying comprises applying an image segmentation algorithm to image data of the image;
for each identified object within the scene, determining a subspace within the 3D coordinate space used by a body of the object;
defining empty spaces within the 3D coordinate space;
receiving data pertaining to a further object to be placed in one of the empty spaces;
determining that a body of said further object does not fit within said one of the empty spaces;
determining a subset of objects from the one or more objects, wherein each object in the subset of objects has a body in the 3D coordinate space being adjacent to said one of the empty spaces;
rearranging at least one object of the subset of objects in the 3D coordinate space, wherein the rearranging comprises, for each object to be rearranged:
identifying one or more surfaces or lines in the scene by analysing image data of the image of the scene, and/or by analysing the 3D coordinate space of the image;
determining a surface or line among the one or more surfaces or lines; and
moving said object to be rearranged along said surface or line in the 3D coordinate space to increase the size of said one of the empty spaces, such that said further object fits in said one of the empty spaces; and
placing the further object in said empty space.

Objects in the image may be segmented (extracted, distinguished, etc.,) using any known algorithm, such as algorithms using one or more of edge features, binary patterns, directional patterns, Gradient features, Spatio-Temporal domain features etc.

The step of identifying one or more objects within the scene may be done by an image search algorithm. By the term "image search algorithm", should in the context of the present specification, be understood as any known way to search for images (of objects) in a database which are similar to an object of the image and use the outcome (e.g. labels/classification of similar images found in the database) to classify the object. Examples of known commercial image search algorithms at the filing of this disclosure comprises Google images, TinEye and Alibabas Pailitao.

The provided method is an improved method for generating a virtual scene. By identifying empty spaces and rearranging objects in the scene, automatic or semi-automatic image manipulation approaches may be facilitated to generate the virtual scene. By identifying objects and moving present objects to fit new objects, the method may be executed in a more efficient manner since the possible ways of moving an object is reduced in an automatic fashion. Thus, the image may be manipulated in an efficient manner and the virtual scene may be generated in an efficient matter.

By moving an object along an identified surface or line (below referred to rearranging surface and rearranging line), a low-complexity model may be provided for generating a virtual scene. The identified rearranging surface or rearranging line may be identified through any known algorithm, such as such as algorithms using one or more of edge features, binary patterns, directional patterns, Gradient features, Spatio-Temporal domain features etc. The rearranging surface(s) or rearranging line(s) may thus be identified by analysing the image data of the image of the scene using known algorithms such as edge detection algorithms, segmentation algorithms, Plane detection algorithm, or a RANSAC algorithm, or a Hough algorithm, etc., to the image data of the image.

The rearranging surface or rearranging line may be determined by calculating a plane in the 3D coordinate space of the image, or by edge detection in the 3D coordinate space or in the image data of the image of the scene to identify a rearranging line.

According to some embodiments, the method further comprises prior to the step of defining empty spaces within the space of the scene, removing at least one object of the one or more objects in the scene. By way of example, a sofa of any other object may be removed from the scene before defining empty spaces. This will in turn result in a larger empty space in the scene, which may be advantageous from an image manipulation perspective to generate the virtual scene. The identified body of the object to remove may be used to in an efficient way remove the object from the scene. Any suitable known image manipulation techniques to e.g. extend the floor or wall in the scene where the removed object used to be may be employed.

According to some embodiments, the method further comprises determining an object type for the removed object, and wherein the received data pertaining to the further object comprises the same object type as the removed object. By way of example, if an object with the object type sofa is removed, the further object may have the object type sofa. In another example, if the removed object type is a table-lamp, the further object may be a lamp. By this configuration, a user may exchange an object without the risk of the method adding an object that is not suitable for the replacement. The receiving of data pertaining to a further object may be executed in a more efficient manner since a filter may be used the receiving a further object such that the number of possible objects is reduced.

According to some embodiments, determining a subset of objects comprises determining an object category of the received data pertaining to the further object and determining the subset of objects such that an object category of each objects of the subset of objects equals the object category of the received data pertaining to the further object. By way of example, if a kitchen table is to be inserted, only kitchen furniture may be moved by the method. Accordingly, the efficiency of the image manipulation may be improved. Accordingly, an efficient method for generating a virtual scene may be achieved. By determining an object category the image manipulation may be performed in an efficient manner.

An object category may be determined for a removed object. In such a case, the data pertaining to a further object may comprise the same object category. In such an example, if a sofa is removed, the object category may be determined to be "living room seating area". Thus, the further object may be within the same object category, and may be a sofa or a chair or a chaise longue etc. By determining an object category, the image manipulation may be performed in an efficient manner since the object category may be used as a filter for the image analysis.

According to some embodiments. The method further comprises determining a scene category of the scene, wherein the scene category corresponds to an object category of at least one of the one or more objects in the scene. The object category for determining the scene category may be a most common object category among the one or more objects. The most common object category may be a defining category of an identified object. By way of example, cutlery is often found in a kitchen, and thus if an object is defined as cutlery, the scene category may be determined to be kitchen. In another example, a bathtub may be a defining object category for defining the scene category since bathtubs are found in a bathroom. By this the method may be executed in a more efficient manner since the configuration provides a filtering option for the receiving of data pertaining to the further object. In some embodiments, the most common object category among the one or more objects in the scene is used for determining the scene category.

According to come embodiments, the step of receiving data pertaining to a further object is based on the determined scene category. Hence, if the scene category is determined to be a kitchen, the further object would be suitable for placement in a kitchen, for example kitchen furniture. By this the method may be executed in a more efficient manner since the configuration provides a filtering option for the receiving of data pertaining to the further object. In another example, if the scene category is a bathroom, the method may put a filter on possible further objects, such as to for example not include furniture comprising textiles.

According to some embodiments, the method further comprises determining one or more exclude areas in the 3D coordinate space, and wherein the step of moving said object is performed such that no object is placed in an exclude area of the one or more exclude areas. By way of example, the area in front of a TV may be determined to be an exclude area, and thus, no large object will be placed in front of the TV. In another example, the space underneath a table may be determined to be an exclude area, accordingly no object will be placed under the table. Accordingly, the present embodiment allows for image manipulation depending on specific areas in the scene being defined as unsuitable for objects. A more flexible approach for image manipulation may thus be achieved.

In some embodiments, the at least one exclude area is determined based on the functionality of at least one of the one or more objects in the scene. By way of example, an exclude area may be determined to be nearby a fireplace due to the increased risk of occurring fires. In another example, a window or a radiator may affect the determination of an exclude area. Advantageously, the exclude areas may be flexibly determined based on objects in the scene. The exclude areas may thus be automatically determined in a flexible way, further facilitating the use image analysis to achieve image manipulation in an automatic or semi-automatic fashion.

In some embodiments the at least one exclude area is based on the scene category. By way of example, if the scene category is determined to be a bathroom, exclude areas may be determined to meet building regulations. Advantageously, the exclude areas may be flexibly determined based scene category in the scene. The exclude areas may thus be automatically determined in a flexible way, further facilitating the use image analysis to achieve image manipulation in an automatic or semi-automatic fashion.

According to some embodiments, the method further comprises a predefined minimum distance between two objects in the 3D coordinate space, and wherein rearranging at least one object of the subset of objects in the scene is performed such that a rearranged object is not within the predefined minimum distance to another object in the 3D coordinate space. Advantageously, the amount of possible placements of objects is reduced which may improve the efficiency of the image analysis. Thus, the method may be executed in a more efficient manner since the possible ways of moving an object is reduced in an automatic fashion According to some embodiments, the step of identifying one or more rearranging surfaces or rearranging lines in the scene comprises identifying one or more rearranging surfaces or rearranging lines in a sub space of the 3D coordinate space, wherein the sub space corresponds to a combined body in the 3D coordinate space defined by the body of each object in the subset of objects. By this, the identifying step is more efficiently implemented.

According to some embodiments, the step of determining a rearranging surface or rearranging line among the one or more rearranging surfaces or rearranging lines comprises determining a rearranging surface or rearranging line being adjacent or intercepting the body of the object to be rearranged in the 3D coordinate space. By this, the object to be moved may be moved a minimal distance. Thus, the method may be executed in a more efficient manner since the possible ways of moving an object is reduced in an automatic fashion.

According to some embodiments, the step of determining a rearranging surface or rearranging line among the one or more rearranging surfaces or rearranging lines comprises determining a rearranging surface or rearranging line being within a threshold distance from the body of the object to be rearranged in the 3D coordinate space. Thus, the method may be executed in a more efficient manner since the possible ways of moving an object is reduced in an automatic fashion.

According to some embodiments, the method further comprises the steps: requesting input from a user pertaining to an object type;

receiving an input from the user, and wherein the step of receiving data pertaining to a further object is based on the input. Accordingly, the step of receiving a further object may be executed in a more efficient manner since a limited number of objects to choose from will be available as the further object. By requesting an input from a user, the image analysis may be performed in an efficient manner since the user input may pertain to any filtering of the image analysis.

According to a second aspect, there is provided a device configured to generate a virtual scene of objects, the device comprising circuitry configured to perform the method described above. The device may comprise one or more processors.

According to a third aspect, there is provided a computer program product comprising a computer-readable storage medium with instructions adapted to carry out the method described above when executed by a device having processing capabilities.

The second and third aspects may generally have the same features and advantages as the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

It will be appreciated that the present invention is not limited to the embodiments shown. Several modifications and variations are thus conceivable within the scope of the invention which thus is exclusively defined by the appended claims.

Image recognition is a common tool for searching and scanning images to identify and classify objects within said image. The aim of an image recognition algorithm (sometimes called image classification algorithms) is to return information about different objects that are present in an image. Image recognition may sometimes be used together with a spatial search algorithm to identify empty areas within an image where another object can be placed.

In the following a method will be described for generating a virtual scene of objects. The method will allow for object to be placed in empty areas of a scene in an image. The method will further allow for automatic rearranging of objects in the image such that a greater variety of objects can be placed in the image.

Figure 1A:
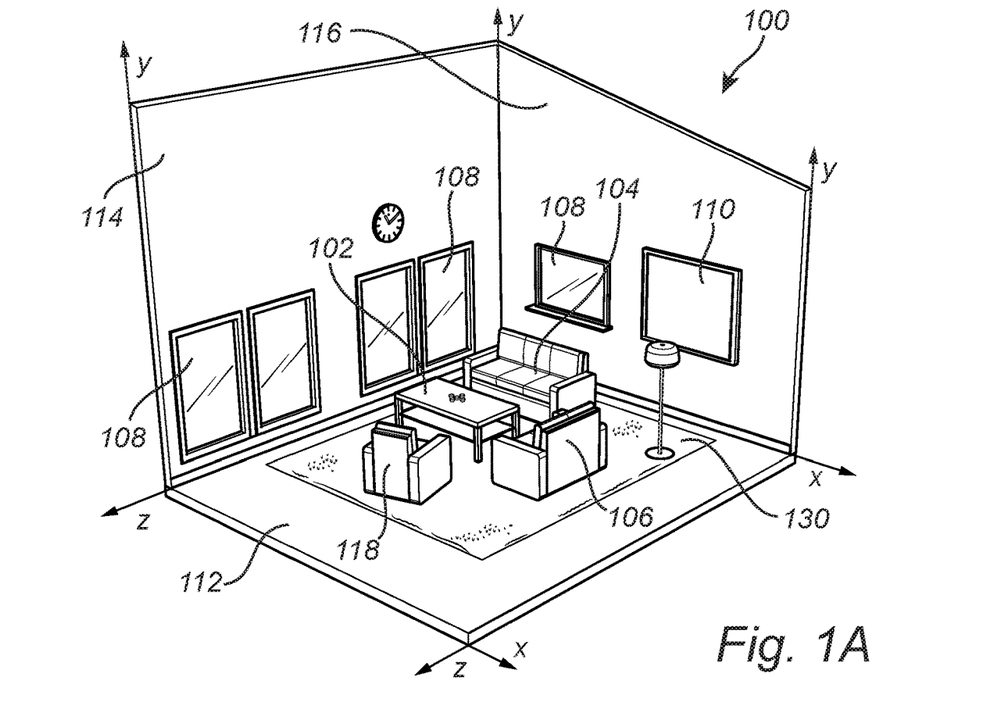
FIG. 1A illustrates an image of a scene.
Figure 1B:
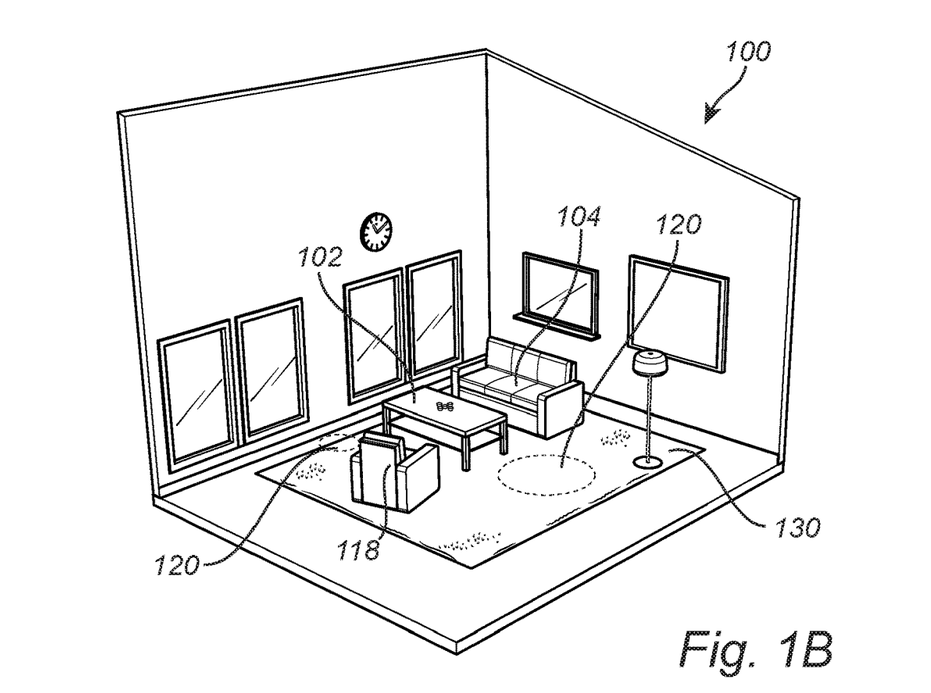
FIG. 1B illustrates the scene of FIG. 1A with a removed object.
Figure 1C:
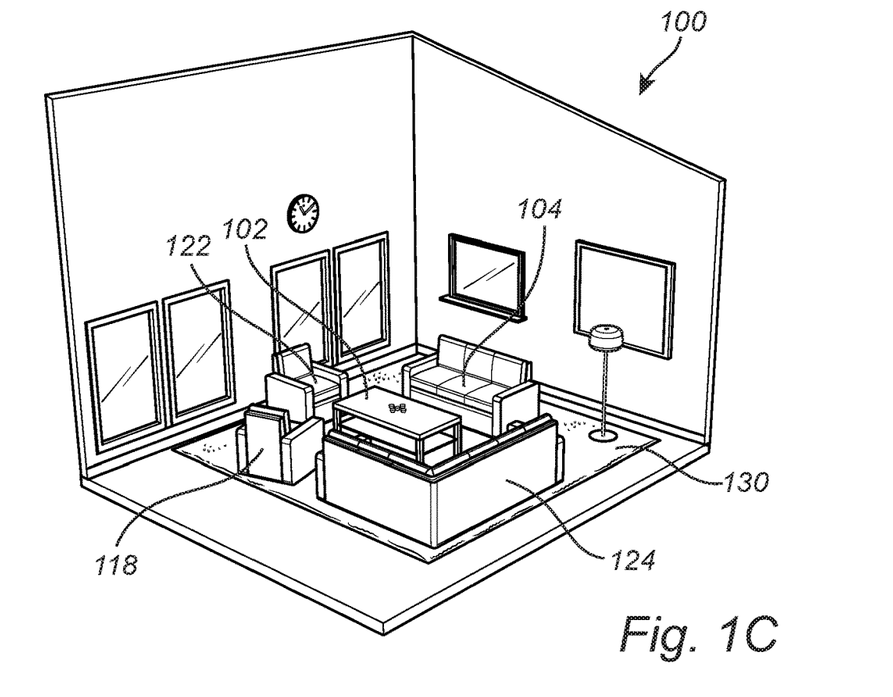
FIG. 1C illustrates a rearranging of the objects of the scene in FIG. 1B.

With reference to FIGS. 1A-1C a room/scene is disclosed as depicted by an image 100. The image 100 may be captured by a mobile device (smartphone, body worn camera etc.,) and sent to another device for analysis. The image 100 may be captured by a camera device. Any other suitable means for capturing an image may be used, such as through the use of a virtual reality head device, etc. The image 100 may depict a scene or a setting. The scene may have a context such as for example a living room, a hallway, or a kitchen table. The context may be a scene category describing the setting of the image 100. The scene category may describe a setting of the image as for example "seating area" of a living room. The image 100 comprises a floor 112 extending in an X, Z plane, a first wall 114 extending in a Y, Z plane and a second wall 116 extending in an X, Y plane. The image 100 shows a window 108 and a painting 110 on the second wall 116.

The image 100 comprises a plurality of objects, in this example a three-seat sofa 104, a two-seat sofa 106, an armchair 118, and a coffee table 102. The image 100 further comprises empty spaces 120 where no objects are present.

To generate a virtual scene of the image, a device comprising one or more processors may be used. The one or more processors may be configured to execute a computer program product comprising code sections having instructions for a method for how to generate a virtual scene of objects. The device may generate the virtual scene by receiving the image and processing said image. The processing of said image is done by image analysis and image manipulation. The generated virtual scene may be displayed on the device, or a mobile device etc. It is noted that the virtual scene may be displayed on any suitable means for displaying a virtual scene.

The image 100 may be provided as a 2D image. By performing image analysis on the image different subspaces may be determined. When determining a subspace for manipulating the image according to the claimed method, only the part of the image that is to be manipulated may be processed. Hence, a method for efficiently providing a virtual scene is provided. To accurately determine a subspace within the space of the scene used by the body of an identified object, a 3D coordinate space is determined S04.

To obtain a high accuracy orientation and location of the objects in the virtual scene, a 3D coordinate space of the image along a X, Y, Z plane/direction is calculated and determined S04. The 3D coordinate space may be determined S04 through applying an algorithm to the image. It is to be noted that there are many algorithms that may be suitable for calculating S04 a 3D coordinate space. By way of example, the 3D coordinate space may be calculated S04 by applying a Plane detection algorithm, or a RANSAC algorithm, or a Hough algorithm, etc., to the image 100.

When processing the image, one or more objects are identified S06. Identifying S06 an object within the scene may be done by an image search algorithm. By the term "image search algorithm", should in the context of the present specification, be understood as any known way to search for images (of objects) in a database which are similar to an object of the image and use the outcome (e.g. labels/classification of similar images found in the database) to classify the object. Examples of known commercial image search algorithms at the filing of this disclosure comprises Google images, TinEye and Alibabas Pailitao. Image search algorithms generally comprises an image segmentation algorithm.

By identifying S06 the one or more objects within the scene, their location, size and facing direction in the 3D coordinate space may be determined. Each object in the scene comprises or is defined by a body.

In other words, within the 3D coordinate space, a body of volume may be determined for the one or more identified S06 objects. For each identified object, a subspace used by a body of the object is determined S08. The subspace of the body is thus determined S06 within the space of the scene, with reference (coordinates etc.) to the 3D coordinate space determined in step S04. The body may for example be an area or a volume etc. The 3D coordinate space may reduce the processing time needed to calculate a location of each identified object in the scene.

When the at least one object's presence and body have been identified, the areas (again, in the 3D coordinate space) not occupied by any object may be determined to be an empty space 120, as seen in FIG. 1B. Empty spaces are defined for the processing means to generate an object that can be placed into the image.

By defining S14 empty spaces 120 of the image 100, information can be calculated as where to place another object. By determining the area or volume of the empty space 120, such data may be used when receiving a further object. For example, there may be a filter option for objects that already fit in determined empty spaces 120. By defining S14 empty spaces, there is provided an area in the 3D coordinate space to where objects already present in the image (identified in step S06) can be moved.

The calculated or extracted data can be used to retrieve a further object that is to be placed in the scene. When receiving a further object, data pertaining to the further object is received by the processor. The data pertaining to the further object may comprise information regarding the height and width or volume, etc. of the further object, along with pixel data or other graphical data (3d, vector, texture, etc.) defining the look of the object. Data pertaining to the further object comprises information relating to the body of said further object. If the further object fits within the determined S14 empty space, the further object may be placed S24 in said empty space.

It may be determined S18 that the body of said further object does not fit within one of the empty spaces. In such case, a subset if objects from the one or more identified S06 objects within the scene, and defined in the context of the 3D coordinate space, is determined S20. The subset of objects may for example be the seating furniture of a living room, hence the subset of objects may be the three-seat sofa 104, the two-seat sofa 106, the arm chair 118, and the coffee table 102 as depicted by the figure. Each object in the subset of objects is determined by them having a body that is adjacent to said one of the empty spaces, where the further object does not fit. In some examples determining a subset of object comprises determining an object category of the received data pertaining to the further object. The subset in such a case is then determined such that the object category for each object of the subset of objects equals the object category of the received data pertaining to the further object. In some examples the method may require a user input, where the user input pertains to which objects are part of a subset. By way of example, in FIG. 2B, the two-seat sofa has been removed S10 with regards to FIG. 1A, and the previously occupied area defines S14 an empty space 120. The fact that the removed object is a sofa may be used to filter the possibilities of a further object to be placed in the scene.

The removed object type is determined S14 to be of the object type "sofa". Thus, the further object may be of the same object type "sofa". The further object is as can be seen in FIG. 1C, a corner sofa 124. Accordingly, since the removed object type was labelled "sofa", this object type may be used as a filtering option for receiving a further object. With the filtering of the further object, the number of different objects that may be received as the further object is limited. Accordingly, the image analysis may be performed in an efficient manner. The body of the corner sofa 124, the further object, is determined S18 to not fit in any of the empty spaces 120. The objects coffee table 102, three-seat sofa 104, and arm chair 118 is determined S20 to be a subset of objects where each object has a body being adjacent to the chosen empty space 120. The subset of objects is rearranged S22, with the aim of creating an empty space in the 3D coordinate space large enough for the corner sofa to be placed. The rearranging surface is identified S22A and determined S22B to be the layout area of the coffee table 102. Accordingly, the rearranging line is the sides of the coffee table 102. As can be seen from FIG. 1C, the object armchair 118 has been moved along the rearranging line, such that the corner sofa is placed S24 in the previously large empty space 120a. Another further object has been placed in another one of the empty spaces, the another further object being an armchair 122.

In some embodiments, the program requests an input from a user. The input may be requested with the intention to obtain a user input pertaining to the object type of a removed object. The input may contain data pertaining to the further object. The input may pertain to a design style.

Accordingly, the device may receive the input made by a user. The user input may be used to place a filter on which objects are possible to choose from when receiving the further object. In some embodiments, the user input may comprise data pertaining to layout options for the objects of the image 100 such that the user can manually rearrange and place objects.

By way of example, the user may input that the removed object type is of a 'seating type', or 'suitable to place on a table', etc. The input may in some embodiments pertain to the scene category of the depicted scene. By way of example, the user may input that the scene category of the image is a living room, a bed room or a hall way etc. Hence, no unrelated object such may be received as the further object.

In some embodiments, the carpet 130 outline may be determined to be a rearranging line. The floor 112 may be determined to be a rearranging surface. Thus, the plane along X, Z may be determined to be a rearranging surface. It is beneficial for the image analysis if the rearranging line or rearranging line is within proximity of the object or the subset of objects to be rearranged. An image search algorithm may be used to determine a rearranging surface or rearranging line in proximity to the objects.

In some examples, an object category is determined for the received data pertaining to the further object. In such example, an object category is determined for the subset of objects. In some examples the most common object category amongst the subset of objects is equal to the object category of the received data pertaining to the further object.

A scene category may be determined based on a most common object category among the objects in the scene 100. The scene category may correspond to a most common object category among the one or more objects in the scene. By determining the scene category, a filter may be provided when receiving data pertaining to the further object such that only objects belonging to the same scene category are an option for being the further object. Thus, the receiving of data pertaining to the further object may be based on the scene category. The scene category may be determined by first determining a defining object type or a defining object category. By way of example, a bath-tub is found in a bathroom, thus a bathtub may be a defining object that defines the scene category. In another example, sharp kitchen knives are found in a kitchen, and may thus be a defining object determining the scene category. An armchair may not be a defining object since an arm-chair may be found in a bed-room, a library, a living room etc.

Figure 2A:
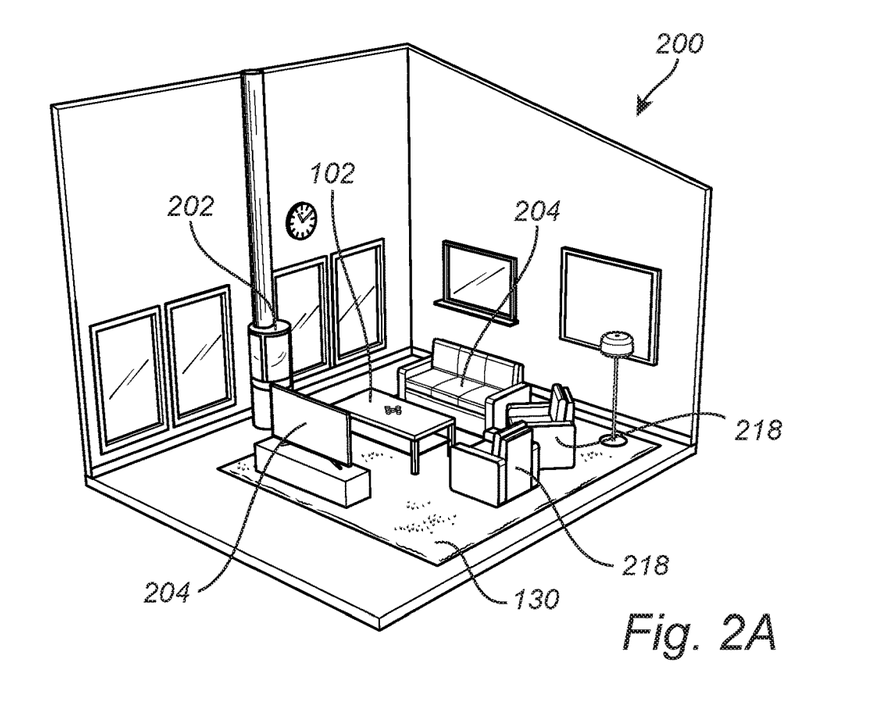
FIG. 2A illustrates another image of a scene.
Figure 2B:
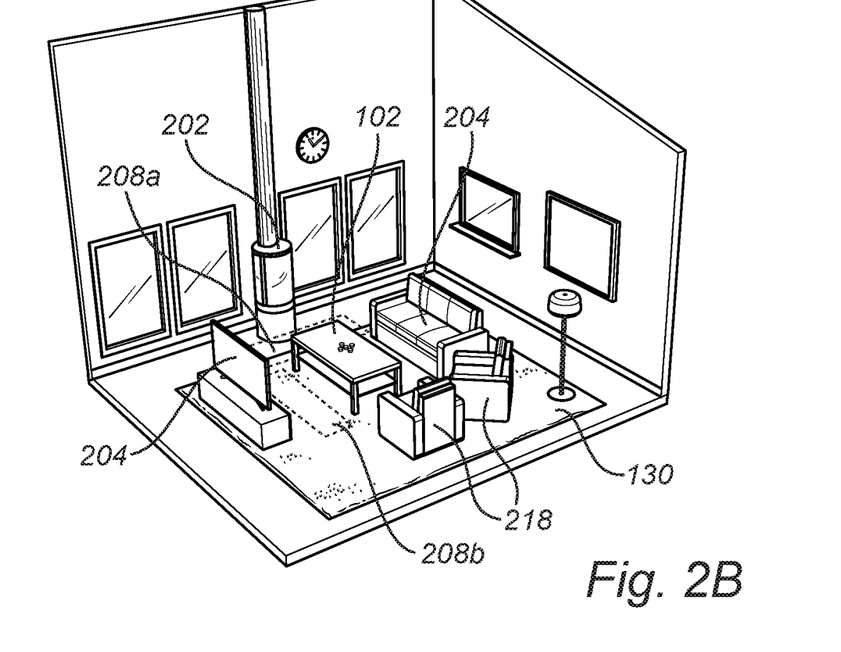
FIG. 2B illustrates exclude areas of the scene of FIG. 2A.
Figure 2C:
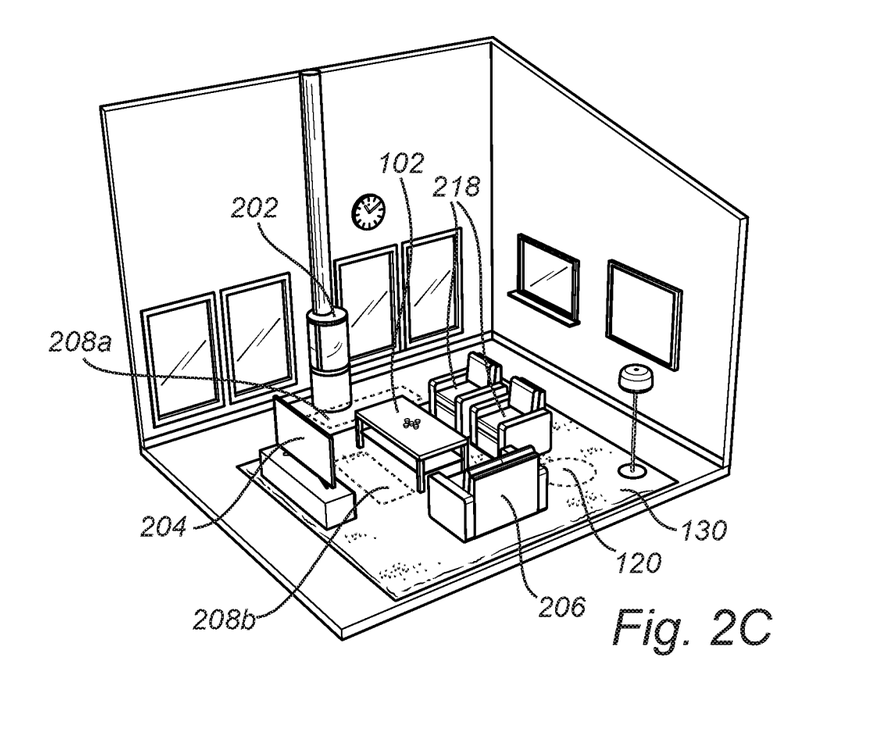
FIG. 2C illustrates a rearranging of objects in the scene in FIG. 2B.

By way of another example, now turning to FIGS. 2A-2C. The image 200 depicts a scene of a living room. Thus, the scene category may be labelled "living room", or "a TV-room". A subset of object in the image 200 comprises a three-seat sofa 204, two arm chairs 218, a coffee table 102, a fireplace 202 and a TV 204.

FIG. 2B shows the determined exclude areas 208a, 208b. An exclude area is a space in the 3D coordinate space where no object can be placed. One exclude area 208a of the figure is in front of the fire place, and another exclude area 208b is in front of the TV. As is the case with the exclude area 208b in front of the object labelled "TV", the exclude area is determined based on the scene category being living room with TV. Each object may have a functionality, by way of example, the object TV, has the functionality to display images or video sequences. In such cases the method may determine an exclude area based on the functionality of identified objects within a scene.

By placing any object in the line of sight from the TV, the functionality of the TV, and the scene may be lost, hence an exclude 208a area is determined. The exclude area 208a in front of the fire place is determined based on the functionality of the fireplace. One functionality of the fire place is to spread heat. Hence, no object is to be placed too close to the emitted heat. FIG. 2C discloses that the three-seat sofa 204 has been removed S10, and the two arm chairs 218 has been moved to where the three-seat sofa 204 was previously placed. The further object is a two-seat sofa being placed S24 in an area previously occupied by the arm chairs 218.

It is to be noted that the defined empty space may be for example an area on a wall, or an area on a floor. Thus, the defined empty space, may be a plane in a 3D coordinate space.

Figure 3:
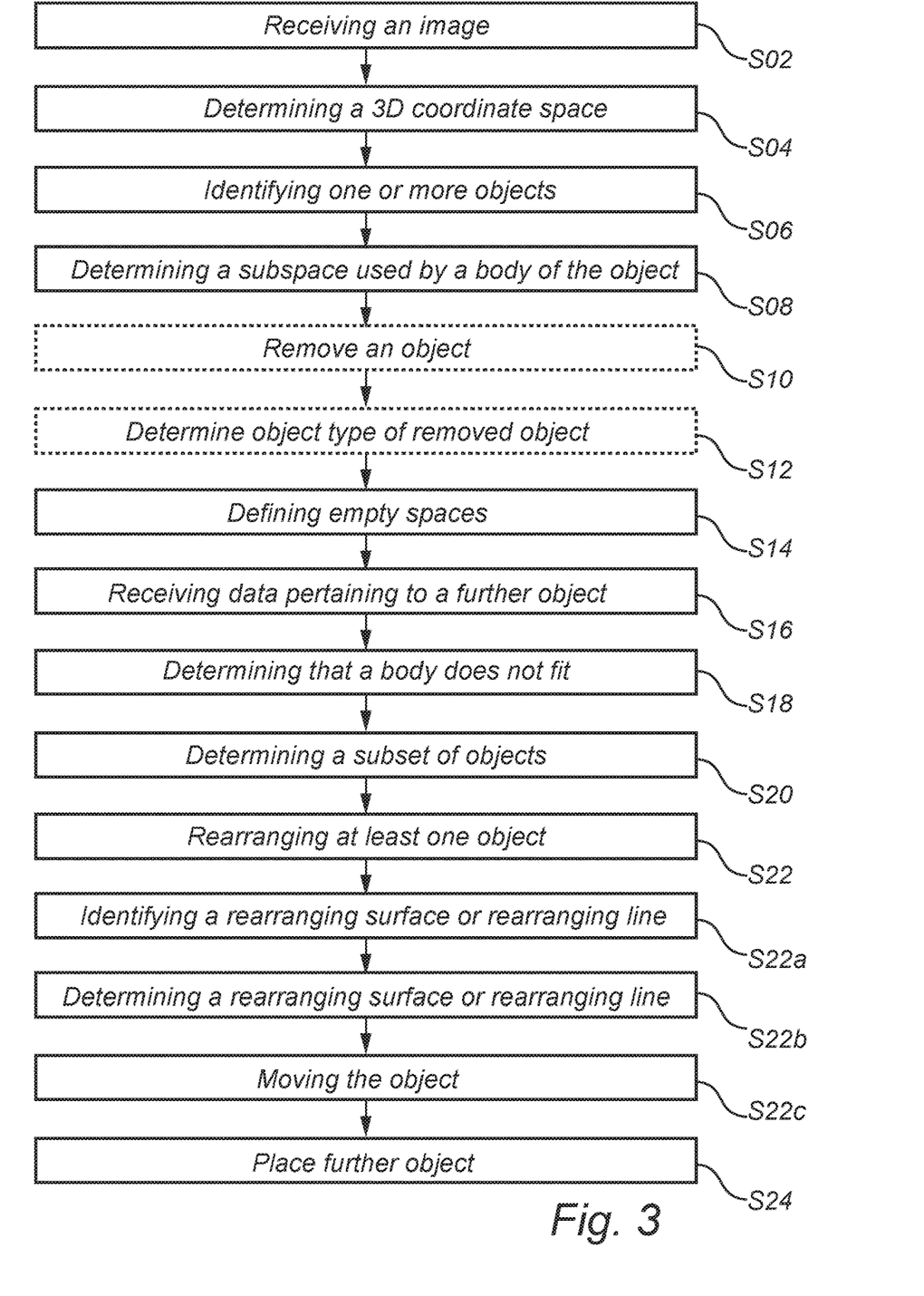
FIG. 3 illustrates a flow chart of a computer implemented method for generating a virtual scene of objects.

FIG. 3 discloses a flowchart of a method for generating a virtual scene. Steps in the method may be performed in any order suitable. The method comprises the following steps (which are detailed according to embodiments above).

Receiving S02 an image depicting a scene. Determining S04 a 3D coordinate space of the scene. Identifying S06 one or more objects within the scene of the image, wherein the identifying comprises applying an image segmentation algorithm to image data of the image. For each identified object within the scene, determining S08 a subspace within the 3D coordinate space being used by a body of an object. An object may be removed S10 from the scene, i.e. from the identified S06 one or more objects within the scene. The removed object may have an object type that is determined S12.

The method continues by the following steps. Defining S14 empty spaces within the 3D coordinate space of the scene. Receiving S16 data pertaining to a further object to be placed in one of the empty spaces. Determining S18 that a body of said further object does not fit within said one of the empty spaces. Determining S20 a subset of objects from the one or more objects. Each object in the subset of objects has a body the 3D coordinate space being adjacent to said one of the empty spaces. Rearranging S22 at least one object of the subset of objects in the 3D coordinate space, wherein the rearranging comprises; for each object to be rearranged: identifying S22A one or more rearranging surfaces or rearranging lines in the scene. Determining S22B a rearranging surface or rearranging line among the one or more rearranging surfaces or rearranging lines by analysing image data of the image of the scene, and/or by analysing the 3D coordinate space of the image. Moving S22C said object to be rearranged along said rearranging surface or rearranging line in the 3D coordinate space to increase the size of said one of the empty spaces, such that said further object fits in said one of the empty spaces. Placing S24 the further object in said empty space. The result will thus be a virtual copy of the scene from the image where an object have been moved/rearranged in an efficient way to make room for another new object. In some embodiments, objects have also been removed/deleted prior to inserting the new object. The virtual scene may then be rendered to e.g. a 2D image or to a VR/AR headset or any other applicable device. The pixel data from the original image may be used when rendering the objects in the virtual scene. In some embodiments, 3d models of the identified objects are received (e.g. based on data from the identification step S06 such as model name etc.) and used for rendering purposes. In some embodiments, suitable algorithms (well known within computer graphics) are used for transforming the original pixel data of an object (e.g. from the image, based on the 3D coordinate system and object position/size in the 3D coordinate system)

to approximate how the object would look from a different viewpoint and then the transformed pixel data is used for rendering purposes.

In some embodiments, the step of determining a rearranging surface or rearranging line among the one or more rearranging surfaces or rearranging lines comprises determining a rearranging surface or rearranging line being adjacent or intercepting (in the 3D coordinate space) the body of the object to be rearranged.

In some embodiments, there is a predefined minimum distance between two objects in the 3D coordinate space. In such an embodiment, when rearranging the at least one object of the subset of objects in the 3D coordinate space, a rearranged object is not placed closer than the predefined minimum distance to another object in the scene. This may ensure that the virtual scene is applicable to the reality. It may further ensure that no two objects are placed too close to each other, for example, the minimum distance may be predefined such that a person can walk between two objects.

In some embodiments, the step of identifying one or more rearranging surfaces or rearranging lines in the scene comprises identifying one or more rearranging surfaces or rearranging lines in a sub space of the 3D coordinate space, wherein the sub space corresponds to a combined body in the 3D coordinate space defined by the body of each object in the subset of objects. Thus, only a specific subspace may be searched for rearranging lines or rearranging surfaces. This may improve the computational speed and processing time of the method.

In some embodiments, the step of determining a rearranging surface or rearranging line among the one or more rearranging surfaces or rearranging lines comprises determining a rearranging surface or rearranging line being adjacent or intercepting the body of the object to be rearranged. The object to be moved may be touching the rearranging surface or rearranging line. By way of example, the rearranging surface may be determined to be a carpet, if the objects to be moved are already standing on the carpet.

In another embodiment, the step of determining a rearranging surface or rearranging line among the one or more rearranging surfaces or rearranging lines comprises determining a rearranging surface or rearranging line being within a threshold distance from the body of the object to be rearranged in the 3D coordinate space.

In some embodiments, industry-specific regulations may be comprised in the method such that placement of furniture near example a fireplace keeps a regulated distance.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer implemented method for generating a virtual scene of objects, the method comprising the steps of:
   receiving an image of a scene;
   determining a 3D coordinate space of the scene;
   identifying one or more objects within the scene, wherein the identifying comprises applying an image segmentation algorithm to image data of the image;
   for each identified object within the scene, determining a subspace within the 3D coordinate space used by a body of the object;
   defining empty spaces within the 3D coordinate space;
   receiving data pertaining to a further object to be placed in one of the empty spaces;
   determining that a body of said further object does not fit within said one of the empty spaces;
   determining a subset of objects from the one or more objects, wherein each object in the subset of objects has a body in the 3D coordinate space being adjacent to said one of the empty spaces;
   rearranging at least one object of the subset of objects in the 3D coordinate space, wherein the rearranging comprises, for each object to be rearranged:
   identifying one or more surfaces or lines in the scene by analysing image data of the image of the scene, and/or by analysing the 3D coordinate space of the image;
   determining a surface or line among the one or more surfaces or lines; and moving said object to be rearranged along said surface or line in the 3D coordinate space to increase the size of said one of the empty spaces, such that said further object fits in said one of the empty spaces; and
   placing the further object in said empty space.

2. The method according to claim 1, further comprising, prior to the step of defining empty spaces within the space of the scene, removing at least one object of the one or more objects in the scene.

3. The method according to claim 2, further comprising determining an object type for the removed object, and wherein the received data pertaining to the further object comprises the same object type as the removed object.

4. The method according to claim 1, wherein determining a subset of objects comprises;
   determining an object category of the received data pertaining to the further object and determining the subset of objects such that an object category of each object of the subset of objects equals the object category of the received data pertaining to the further object.

5. The method according to claim 1 further comprising determining a scene category of the scene, wherein the scene category corresponds to an object category of at least one of the one or more objects in the scene.

6. The method according to claim 5, wherein the step of receiving data pertaining to a further object is based on the determined scene category.

7. The method according to claim 5, wherein at least one exclude area is based on the scene category.

8. The method according to claim 1, further comprising determining one or more exclude areas in the 3D coordinate space, and wherein the step of moving said object is performed such that no object is placed in an exclude area of the one or more exclude areas.

9. The method according to claim 8, wherein at least one exclude area is determined based on the functionality of at least one of the one or more objects in the scene.

10. The method according to claim 1, further comprising a predefined minimum distance between two objects in the 3D coordinate space, and wherein rearranging at least one object of the subset of objects in the scene is performed such that a rearranged object is not within the predefined minimum distance to another object in the 3D coordinate space.

11. The method according to claim 1, wherein the step of identifying one or more surfaces or lines in the scene comprises identifying one or more surfaces or lines in a sub space of the 3D coordinate space, wherein the sub space corresponds to a combined body in the 3D coordinate space defined by the body of each object in the subset of objects.

12. The method according to claim 1, wherein the step of determining a surface or line among the one or more surfaces or lines comprises determining a surface or line being adjacent or intercepting the body of the object to be rearranged in the 3D coordinate space.

13. The method according to claim 1, wherein the step of determining a surface or line among the one or more surfaces or lines comprises determining a surface or line being within a threshold distance from the body of the object to be rearranged in the 3D coordinate space.

14. A device configured to generate a virtual scene of objects, the device comprising circuitry configured to perform the method of claim 1.

15. A computer program product comprising a non-transitory computer-readable storage medium with instructions adapted to carry out the method of claim 1 when executed by a device having processing capabilities.

* * * * *